US005513868A

United States Patent [19]

Barr

[11] Patent Number: 5,513,868

[45] Date of Patent: May 7, 1996

[54] ALL TERRAIN VEHICLE TRAILER

[76] Inventor: Eugene L. Barr, 328 Reimer Rd., Wadsworth, Ohio 44281

[21] Appl. No.: 310,700

[22] Filed: Sep. 22, 1994

[51] Int. Cl.$^6$ .................................. B62D 47/00
[52] U.S. Cl. ...................... 280/400; 280/789; 296/181
[58] Field of Search ........................ 280/202, 204,
280/656, 415.1, 424, 400, 63, 79.2, 789,
769, 304.5, 32.7, 400, 292; 296/24.1, 37.1,
50, 63, 64, 187, 182, 199

[56] References Cited

U.S. PATENT DOCUMENTS

| | | | |
|---|---|---|---|
| 170,543 | 11/1875 | Franklin . | |
| D. 294,539 | 3/1988 | Coggins | D3/40 |
| 334,908 | 1/1886 | Smith . | |
| 730,352 | 6/1903 | Draper . | |
| 1,054,755 | 3/1913 | Draper | 296/37.1 X |
| 1,333,290 | 3/1920 | Bonner . | |
| 2,294,564 | 9/1942 | Leber | 296/66 |
| 2,549,129 | 4/1951 | Pickett | 296/26 |
| 2,563,372 | 8/1951 | Risse | 280/656 X |
| 3,151,906 | 10/1964 | Roberts | 296/66 |
| 3,503,620 | 3/1970 | Koskovich et al. | 280/415.1 X |
| 3,746,363 | 7/1973 | Borns | 280/124 A |
| 3,747,955 | 7/1973 | MacAlpine | 280/202 X |
| 3,771,810 | 11/1973 | Barnett | 280/63 |
| 3,829,151 | 8/1974 | Fellenstein | 296/64 |
| 3,936,070 | 2/1976 | Owings | 280/47.18 |
| 4,089,544 | 5/1978 | Myers | 296/24.1 |
| 4,300,783 | 11/1981 | Fisher | 280/87.02 |
| 4,306,733 | 12/1987 | Cox | 280/656 X |
| 5,222,753 | 6/1993 | Parish | 280/400 |

FOREIGN PATENT DOCUMENTS 4219121  12/1993  Germany .......................... 280/204

OTHER PUBLICATIONS

"ATVs: Perception and Reality" Popular Mechanics Skorupa (May 1990), p. 51.
"AVTs: Living Responsibly" Popular Mechanics Youngs (Mar. 1991), p. 90.

Primary Examiner—Margaret A. Focarino
Assistant Examiner—Victor E. Johnson
Attorney, Agent, or Firm—Mueller and Smith

[57] ABSTRACT

A trailer attachable to an all terrain vehicle (ATV) and being particularly suited for use in off-road environments. The trailer has a main frame assembly and two wheels each supported from an independent axle support assembly having a substantially open gap extending therebetween. Each axle support assembly includes a skid component slidably engagable with off-road obstacles. Extending under and outwardly from the main frame assembly is a hitch arm having an end portion couplable to the ATV. The hitch arm includes a skid portion also slidably engagably with off-road objects. Both passengers and cargo may be simultaneously transported from a container housing. This container housing is supported upon the main frame assembly and defines a rearwardly extending cavity for cargo and a seat for passengers. A front shield extends vertically from the main frame assembly and provides a protective safety wall between passengers and the ATV. This front shield includes a lip for deflecting debris propelled toward passengers and a handle for passenger support.

14 Claims, 2 Drawing Sheets

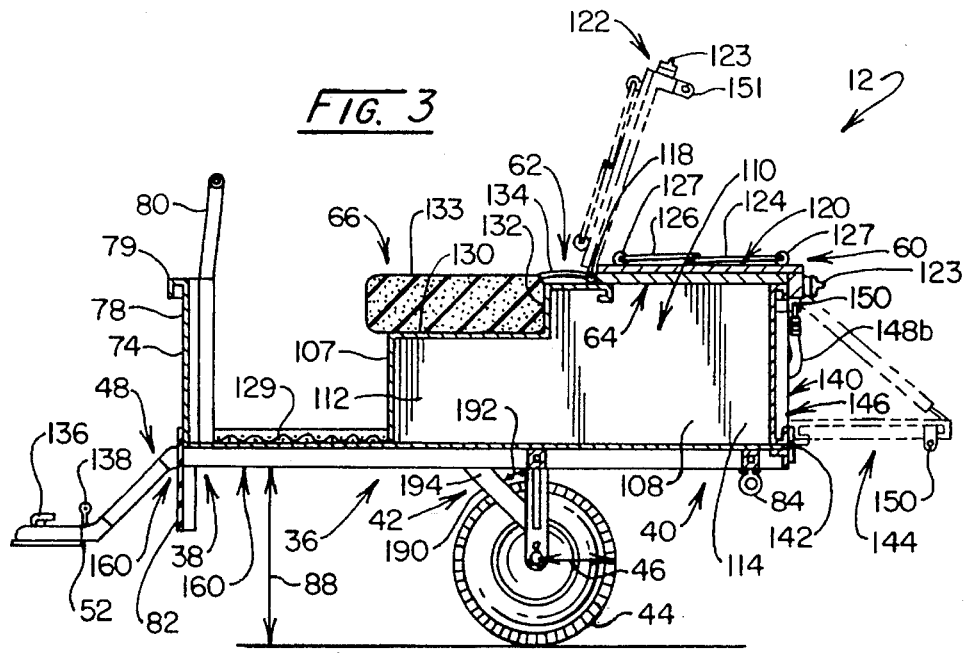
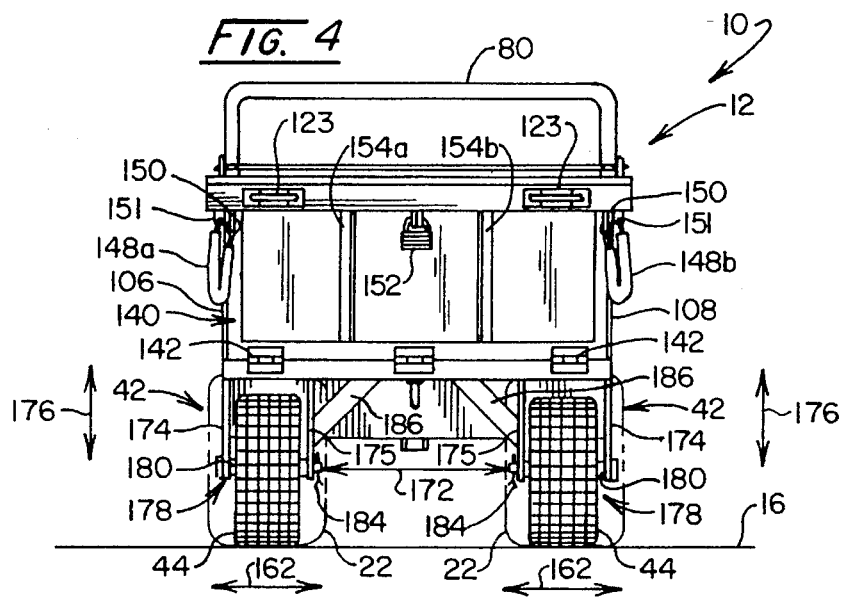
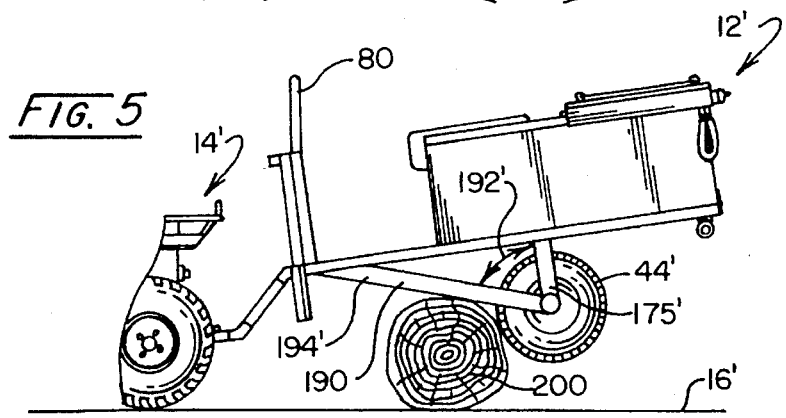

ALL TERRAIN VEHICLE TRAILER

BACKGROUND OF THE INVENTION

Recreational all-terrain vehicles (ATVs) have wide application in off-road use. These vehicles are coined the "motorized mules of the outback" taking passengers where few 4×4 s dare to go. Their range nearly equals that of motorcycle dirt bikes; yet unlike motorcycles, four wheel drive ATVs are beasts of burden that can carry passengers plus hundreds of pounds of gear. Youngs, "ATVs: Living Responsibly," *Popular Mechanics*, (March 1991), p. 90. To accommodate for this off-road use, ATVs have over-sized, soft, and heavily treaded tires which are designed for non-pavement surfaces. The tires are mounted to a robust steel frame supporting, with heavy duty shock absorbers, a powerful gas powered engine. The tires are spaced to cut a wide swath, and the frame generally is low to stabilize the vehicle around a low center of gravity. Upon returning from a back country ATV trip, one outdoorsman commented as follows: "I spent a week in off-road locations lugging around two van loads of equipment and realized I couldn't have done it without the help of a motorized all-terrain workhorse." During the trip, "We loaded up the front and rear carrying racks and clawed our way over boulder-studded trails, near vertical inclines and rugged canyon walls." Skorupa, "ATVs: Perception and Reality," *Popular Mechanics*, (May 1990), p. 51.

As the preceding commentary illustrates, ATVs often may be called upon by outdoorsmen, in particular fisherman, campers, and hunters, to carry not only passengers but gear as well. One problem, however, is that equipment, accessories, and other loads can be bulky and weigh several hundred pounds. Although many ATVs can be equipped with both front and rear carrying racks, this space often is inadequate. A weekend camping expedition, for example, may require numerous pieces of equipment such as tents, cooking accessories, sleeping apparel, clothing, and food, not to mention recreational paraphernalia, such as fishing poles, tackle, and gear.

The problem of insufficient carrying accommodations on ATVs has been addressed in so much as ATVs commonly are equipped with a rearwardly disposed towing tongue assembly which is attachable to a standard trailer hitch. Heretofore, trailers used with ATVs generally have two wheels mounted to a frame with an open, rear bed. These trailers typically, though, are not sufficiently adapted for use in all off-road environments traversable by the ATV itself. In this regard, ATVs often are used in extremely rugged terrain, and for example, are capable of climbing over rather large obstacles. Trailers, on the other hand, generally are not suited for such use and may become stuck. Trailers, for example, commonly have an axle extending between the wheels. This axle, however, is prone to catch on logs, stumps, rocks, or other obstacles while the trailer is driven off-road. In other terrain, for instance, the ATV and trailer may be required to pass through deep mud or snow. In these situations, if the trailer is too difficult to pull, both may become stuck.

Most ATVs have a seat configured to carry one or two passengers. Instances can arise, however, in which the ATV is called upon to accommodate more passengers. As an example, ATVs frequently are used by hunting and camping parties having one guide and several passengers. A separate ATV for each hunter or camper may not be practical or economical.

Additionally, during outings, the weather may be less than cooperative, and campers, hunters, fisherman, or the like may find themselves in the midst of an unexpected rain or snow shower. In these situations, all unprotected gear stored in an open-bed type trailer is exposed and may become damaged. In other instances as well, users may wish to leave their gear unattended yet keep it locked and secure in a safe location. Campers, for example, may spend time away from the campsite hiking, exploring, or fishing and certainly would not welcome returning to find some of their belongings missing.

At present, ATV users would welcome a trailer adapted for off-road use and capable of simultaneously hauling both passengers and cargo.

SUMMARY

The present invention is addressed to a trailer attachable to an all terrain vehicle (ATV). This trailer is particularly suited for non-pavement surfaces and capable of being used in extremely rugged terrain and other off-road environments. In this regard, the trailer has a main frame assembly with a vertical clearance greater than that of the ATV enabling the trailer to pass over, without contacting, larger objects typically found off-road. Two wheels are provided, each supported from an independent axle support assembly. Thus, clearance gap extends between these axle support assemblies providing an unobstructed passageway between each wheel.

If larger off-road objects are encountered, the trailer is adapted to engage with and then pass over these obstacles without becoming stuck, while at the same time reducing the potential for any structural damage. In this regard, a hitch arm extends under the main frame assembly and outwardly therefrom. This hitch arm has a skid portion provided to slidably engage with these larger off-road obstacles so the trailer may slide over top of them. Additionally, each axle support assembly includes a skid component extending angularly to the main frame assembly. These skid components support and protect the wheels and enable the trailer to skid over or slidably engage with off-road obstacles, such as logs, stumps, rocks, and the like.

The trailer also is able to simultaneously carry both passengers and cargo. A container housing supported upon the main frame assembly defines a rearward cavity for carrying and storing cargo, equipment, and other loads. This container housing has a top lid assembly and a rearward tailgate which together provide a waterproof enclosure for the rearward cavity. The tailgate and lid also may be secured and thereafter locked to protect stored cargo therein. Additionally provided is a seat for carrying several passengers. This seat is disposed having a height greater than the operating seat position of the ATV. In this regard, passengers are seated at a higher point than an ATV operator and, as a consequence, have an unobstructed horizontal view.

As another feature, a front shield extends vertically from the main frame assembly and provides a protective safety wall or barrier between the passengers and the ATV. The shield includes a lip for deflecting debris propelled toward the passengers and a handle for passenger support.

As an additional advantage, the wheels of the trailer are separated a distance such that the wheels follow in the path formed by the tires of the ATV, enabling the trailer to be more easily pulled through mud, snow, water, and underbrush.

Other objects of the invention will, in part, be obvious and will, in part, appear hereinafter. The invention, accordingly, comprises the apparatus possessing the construction, combination of elements, and arrangements of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 3 is a sectional view taken through the plane 3—3 shown in FIG. 2;

FIG. 4 is a rear view of the trailer shown in FIG. 1; and

FIG. 5 an alternate embodiment of the trailer according to the invention showing a partial side view of the trailer and attached all terrain vehicle passing over an off-road obstacle.

DETAILED DESCRIPTION

Figure 1:
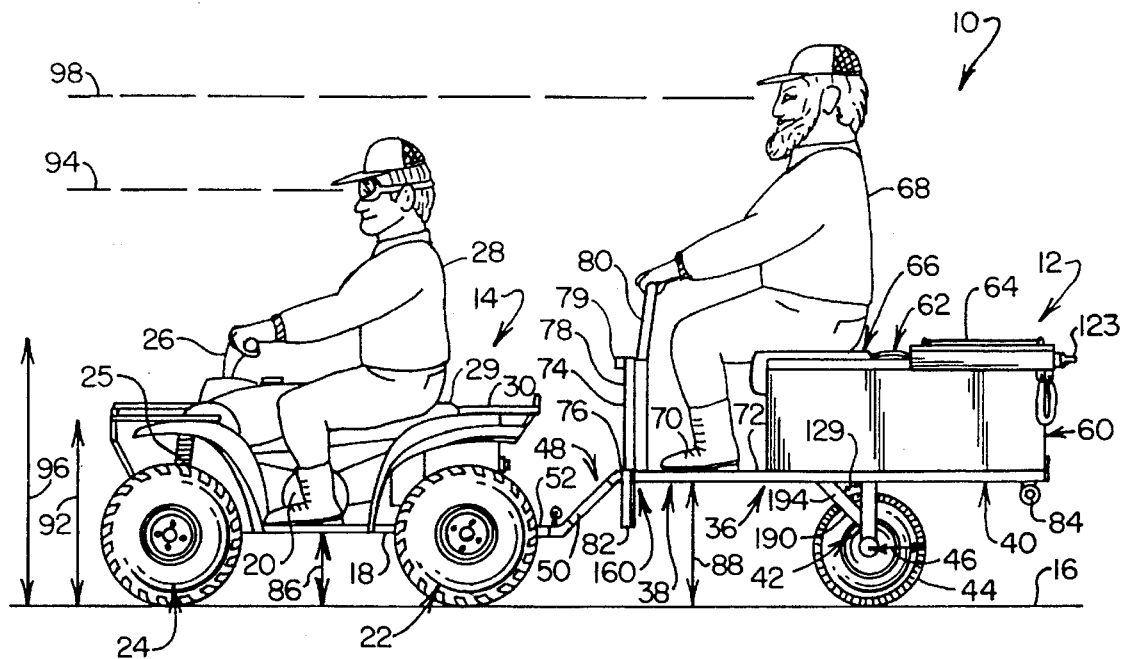
FIG. 1 is a side view of a trailer according to the invention attached to an all terrain vehicle.

Looking to FIG. 1, an all-terrain transportation system is shown generally at 10 to include a trailer 12, according to the invention, attached to a vehicle 14. System 10, and in particular trailer 12, is suited for use off-road and is adapted to be driven over terrain exhibiting off-road obstacles such as logs, stumps, rocks, ruts, and the like. Both vehicle 14 and trailer 12 are shown positioned on a level ground 16.

Vehicle 14 is seen to be a recreational type all-terrain vehicle (ATV) or sports utility vehicle generally having a steel frame 18 supporting a gas powered engine 20, pairs of rearward and forward wheels 22 and 24, respectively, shock absorbers such as that shown at 25, and steering bars 26. An operator 28 is seated in an operating position upon a seat 29. ATVs of the type depicted commonly are equipped with a rearward carrying rack 30 and a rearwardly-disposed towing tongue assembly (not shown) positioned between the pair of rearward wheels 22. This towing tongue assembly generally consists of an arm with a steel ball end removably couplable with a standard hitch arm. FIG. 1 illustrates an arrangement in which trailer 12 is attached to the towing tongue assembly of ATV 14.

Trailer 12 is shown to generally consist of a mainframe assembly 36 extending between a forward portion 38 and a rearward portion 40. The mainframe assembly 36 generally is formed from 1.5 inch wide by 3/16 inch thick angle iron spot welded together. Four such angle iron members may be welded into a rectangular periphery which is approximately 44 inches wide and 61 inches long. Angle iron cross members (not shown) also may be welded across this periphery for strength and stability. A pair of axle support assemblies 42 extends downwardy from mainframe assembly 36. Each support assembly at 42, in turn, supports a wheel, one of which is shown at 44. These wheels each have a radius 46 and are preferably heavily treaded for off-road use. Wheels 44 may, for example, have a size of 22×7.50/12. Extending outwardly from forward portion 38 is a hitch arm 48 having a first downwardly angled portion 50 and a second generally horizontal portion 52 extending therefrom.

Supported upon mainframe assembly 36 is a container housing 60 for carrying and storing cargo, equipment, or other such loads. Container housing 60 generally is coextensive with the widthwise dimension of mainframe assembly 36 and is shown having a top portion 62 which includes a lid assembly 64. In addition to carrying cargo, trailer 14 is particularly suited for transporting passengers. In this regard, top portion 62 also includes a seat assembly 66 adjacent lid assembly 64. Seat assembly 66 may support several passengers, with one being shown at 68. Passenger 68 is in a seated position having feet 70 supported upon a foot stand 72. This foot stand 72 is supported on mainframe assembly 36 and provides foot support for passengers and may, for example, be used as a step for entering onto and exiting from trailer 12.

Adjacent foot support 72 is a front shield 74. This shield 74 has a lower portion 76 supported upon mainframe assembly 36 and an upper portion 78 extending upwardly therefrom. Front shield 74 is formed as a solid wall which extends the width of mainframe assembly 36 and is preferably formed of sheet steel having a thickness of about 14 gauge. Shield 74 provides a protective safety wall or barrier between passenger 68 and ATV 14. As an example, during transportation of trailer 12, shield 74 may block or deflect debris such as dirt, mud, stones, and the like propelled towards passengers from the ATV rearward wheels 22. As an additional safety measure, upper portion 78 has a forwardly extending lip 79 for deflecting such debris propelled towards passengers 68. Also shown is a mud flap 82 located below the mainframe assembly forward portion 38. Mud flap 82 shields against debris deflected towards trailer 12 and may, for example, be made of rubber and is pop riveted to the forward portion 38 of main frame assembly 36.

A hand bar 80 is revealed extending upwardly from upper portion 78 of front shield 74. Hand bar 80 is hand graspable by passengers and provides a convenient support during transportation. FIG. 1 shows passenger 68 grasping this handle which may be formed in a tubular configuration and spot welded to front shield 74 as at upper portion 78. As shown, container housing 60 is approximately 44 inches by 44 inches by 19 inches. The mainframe assembly 36 is 61 inches long and 44 inches wide. These dimensions correspond with the trailer 12 shown in FIG. 1 and may vary, for example, for larger or smaller trailer sizes.

Situations may arise in which the trailer 12 itself may become stuck or in which the trailer may be called upon for pulling or dragging purposes. In this regard, FIG. 1 shows that trailer 12 is equipped with a tow ring 84. This ring extends downwardly from mainframe assembly 36 and is welded thereto.

As shown in FIG. 1, ATV frame 18 of ATV 14 has a vertical ground clearance height 86 from ground 16. This height 86 varies depending on the type of ATV but typically may be about 9 inches. As seen, though, the trailer 12 has a vertical ground clearance height 88 which is greater than height 86. This height difference, about 12 inches, is particularly advantageous in that mainframe assembly 36 of trailer 12 can pass over, without contacting, obstacles that must be driven over by ATV 14. In order to position mainframe assembly 36 above ATV frame 18, the first portion 50 of hitch arm 48 extends outwardly and downwardly from mainframe assembly forward portion 38. This downwardly extending distance preferably is approximately 10 inches, and the outwardly extending distance is approximately 24 inches.

Looking to FIG. 1, ATV operator 28 is seated on seat 29 which has a vertical operating seat position height shown by line 92. From this seated position, operator 28 has a horizontal view along dashed sight line 94. Passenger 68 is seated having a vertical seat position height shown by line 96. From this seated position, passenger 68 has a horizontal view along dashed sight line 98. As illustrated, the vertical seat position height 96 of passenger 68 is greater than the vertical seat position height 92 of operator 28. This difference in vertical seat positioning is particularly advantageous in that passenger 68 may see over operator 28 and otherwise not have an obstructed view. In this regard, hunters, for example, seated upon seat 66 will have a horizontal view above that of operator 28 and thus have an unobstructed view to spot game. The difference in height between horizontal view lines 94 and 98 is approximately 10 inches.

Figure 2:
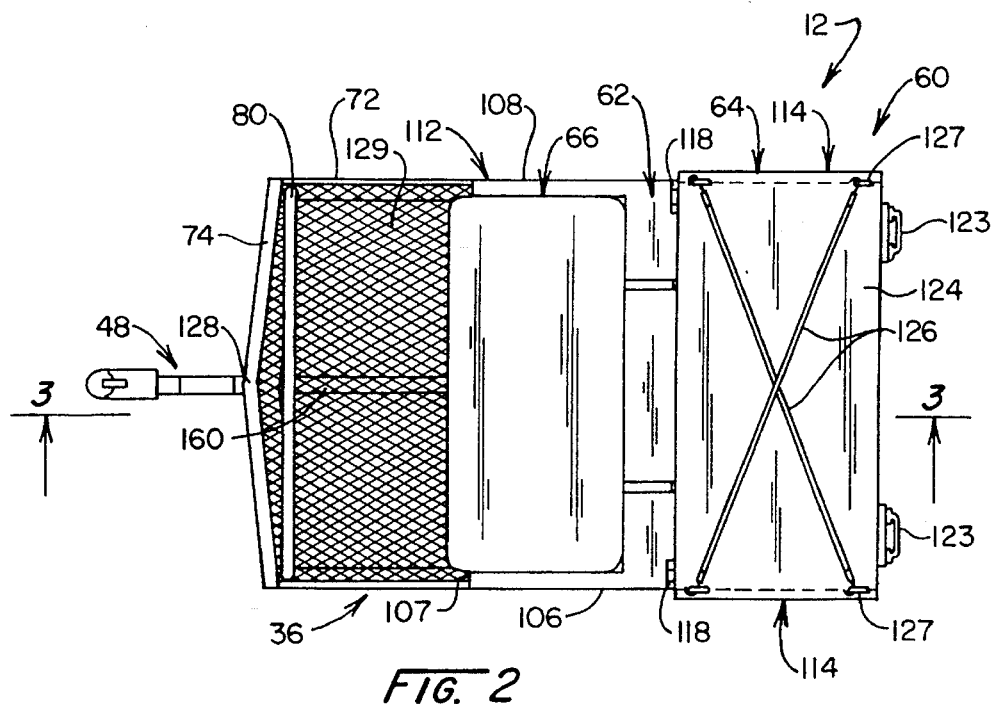
FIG. 2 is a top view of the trailer component of FIG. 1.

Turning now to FIGS. 2 and 3, container housing 60 is seen to have three upstanding walls 106, 107, and 108 extending upwardly from mainframe assembly 36. These walls define an open rearwardly extending cavity 110 extending therebetween. Walls 106 and 108 are oppositely disposed sidewalls, each further including a forward end 112 and a rearward end 114. Wall 107 extends between the forward portions 112 of walls 106 and 108 as a forward end wall of cavity 110. As shown, top portion 62 of container housing 60 extends between walls 106 to 108 over this rearward cavity forming a top enclosure. This top portion generally includes seat 66 and lid assembly 64.

FIGS. 2 and 3 show that lid assembly 64 is pivotally mounted at the top portion by hinges 118 and extends between sidewalls 106 and 108 for covering rearward cavity 110. These hinges 118 are provided for allowing access from top portion 62 into rearward cavity 110. In this regard, FIG. 3 reveals that lid 64 is positionable between a closed position 120 and an open position 122 (shown in phantom). In this open position 120, lid 64 generally is vertically oriented allowing for the noted top access into rearward cavity 110. By contrast, in the closed position 120, lid 64 is horizontally oriented, effectively blocking top access into rearward cavity 110. A pair of handles 123 are provided for lifting lid 64 between the open and closed positions. These handles 123 may be welded to lid 64.

Although cargo may be stored within rearward cavity 110, loads also may be placed and transported on a top surface 124 of lid 64 shown in FIG. 2. Straps 126 are provided for securing or retaining cargo mounted to surface 124 These straps 126, for example, may be elastic bungi cords fastened to eyehooks 127 attached to top surface 124. During transportation of trailer 12, cargo placed on lid 64 may vibrate against top surface 124 producing a rattling type noise. In some instances, for example during hunting or wildlife observation, this noise may be undesired as wildlife is alerted. In this regard, top surface 124 may be formed of a sound absorbing material to eliminate any vibrational or rattling noise. This material, for example, may be outdoor carpeting.

FIG. 2 also reveals front shield 74, foot support 72, and hand bar 80 in more detail. In this regard, front shield 74 may be slightly bowed at 128 to add strength and rigidity. This bow is shown extending outwardly from hand bar 80. Bar 80 extends above portion 78 of front shield 74 and may have a slight vertical cant. Foot support 72 extends between front shield 74 and wall 107 of container housing 60. In order to keep debris, such as mud, water, snow, and the like, from accumulating, support 72 can be made of an open steel web or mesh shown at 129 in FIGS. 2 and 3. Mesh 129 also provides a secure foot hold for feet 70 of passengers 68.

Turning to FIG. 3, seat assembly 66 is shown in more detail. Assembly 66 includes a flat top support surface 130 extending partially over rearward cavity 110 and horizontally between sidewalls 106 (FIG. 2) and 108. Top surface 130 may be disposed below the lid 64 to provide a stepped recess 132 between sidewalls 106 and 108. A foam cushion 133 is shown positioned within this recess 132. Cushion 133 may be secured within recess 132 with straps 134 attached to lid 64 and, for example, may be 4 inch thick with a foam padding surrounded by a vinyl exterior.

FIG. 3 reveals that horizontal portion 52 of hitch arm 48 includes a ball coupler end 136. This end 136 is removably couplable to the towing tongue assembly (not shown) of ATV 14 for securing trailer 12 thereto. Also shown is a ring 138 welded to and extending vertically from horizontal portion 52. This ring 138 is adapted to receive a chain, rope, or the like for pulling the trailer or otherwise securing it.

Looking now to FIGS. 3 and 4, container housing 60 of trailer 12 further comprises a tailgate 140 extending between sidewalls 106 and 108 at rearward ends 114. As illustrated, tailgate 140 is pivotally coupled with hinges at 142 to rearward portion 40 of mainframe assembly 36. These hinges 142, in turn, enable tailgate 140 to be movable between a horizontal open position 144 (shown in phantom in FIG. 3) and a vertical closed position 146. Two leveling or pivot restricting attachments 148a and 148b are provided for securing and maintaining tailgate 140 in the horizontal position 144. Attachments 148a and 148b, for example, can be 1.25 inch link steel chains with one end connected to a sidewall 106 and 108, respectively, and a second end spot welded to tailgate 140.

With tailgate 140 in the closed orientation 146, cargo, equipment, or other loads may be secured or locked within rearward cavity 110 of container housing 60. In this regard, both tailgate 140 and lid assembly 64 each have a connector component 150 and 151, respectively, which are alignable while tailgate 140 is in the vertically closed position 146. Each connector component 150 and 151, for example, can be a standard hinged hasp assembly securable with a padlock 152 shown in FIG. 4. Additionally, as shown in FIG. 4, two vertical support bars 154a, 154b, are welded to tailgate 140 to provide rigidity thereto. When tailgate 140 is in the closed orientation 146, rearward cargo space 110 preferably has dimensions of approximately 43 inches by 43.5 inches by 20 inches.

ATVs commonly are used off-road on and off pre-existing trails. Even trails, however, can become quite muddy or snow covered which may make it difficult for ATV transportation. In this regard, FIG. 4 reveals that rearward wheels 22 of ATV 14 are spaced apart a width to define a track or path shown by lines 162. During off-road driving, rearward wheels 22 form two such tracks 162, for example, when ATV 14 is driven through snow, mud, underbrush, or the like. Wheels 44 of trailer 12 are spaced apart a distance such that each wheel 44 follows in these tracks 162. In turn, trailer 12 is pulled more easily on off-road surfaces since the wheels 22 are not required to form a separate track.

FIGS. 2 and 3 reveal that hitch arm 48 has a skid portion 160 which extends from forward portion 38 of mainframe assembly 36 to rearward portion 40. This extension length is about 56 inches. Skid portion 160 is provided to act as a skid member for slidable engagement over off-road obstacles contacting mainframe assembly 36 of trailer 12. In this regard, the vertical ground clearance height 88 extending from ground 16 to main frame assembly 36 and is approximately 21 inches. When trailer 12 encounters obstacles having a verticality greater than height 88, skid portion 160 will contact these obstacles and slidably engage with them. During this engagement, forward portion 38 is elevated such that mainframe assembly 36 can slide over the object and allow trailer 12 to pass over the object without becoming stuck.

FIGS. 1, 3, and 4 reveal that axle support assemblies 42 extend from mainframe assembly 36 to wheels 44. FIG. 4 shows that each axle support assembly 42 is independently suspended from mainframe assembly 36 having a substantially open gap indicated by line 172 extending therebetween. This gap 172 provides an unobstructed passageway between wheels 44. The absence of a continuous single axle enables trailer 12 to pass over larger off-road obstacles Examining the suspension system in more detail, FIG. 4 reveals that each axle support assembly 42 has two spaced-apart suspension supports 174 and 175. Each of these suspension supports extends downwardly from mainframe assembly 36 a predetermined vertical distance 176 to a wheel attachment portion 178. This distance 176 is approximately 13 inches. Wheels 44, in turn, are mounted for free rotation between suspension supports 174 and 175 upon attachment portion 178. In this regard, each wheel attachment portion 178 consists of an axle 180 extending horizontally between corresponding pairs of suspension supports 174 and 175. Each axle 180 is adapted to receive and mount a wheel 44. In order to secure axle 180, a cotter pin assembly 184 may be used.

In general, ATVs specifically are designed for non-pavement surfaces and have large, soft tires and sturdy suspensions able to withstand and absorb rigorous off-road riding. In this regard, trailer 12 also is adapted to be used in all types of off-road terrain traversable by the ATV 14 itself. Looking first to FIG. 4, each axle support assembly 42 has a lateral support bar 186 extending from a suspension support 175 to mainframe assembly 36. These lateral support bars 186 add strength and stability to axle support assembly 42 and, in particular, aid in inhibiting any lateral movement of wheels 44 during off-road driving. These supports, for example, can be formed from ⅜ inch steel. Looking now to FIGS. 1 and 3, each axle support assembly 42 is seen to further consist of a skid component 190 extending from one of the suspension supports 175 (FIG. 3) to mainframe assembly 36. These skid components 190 reinforce the structural strength and rigidity of axle support assembly 42. The skid components 190 are each angularly disposed with respect to one of the suspension supports 175 forming an angle 192 therewith. This angle 192, for example, can be 45°. The skid components also each have a forward contact portion 194. Each forward contact portion 194 extends horizontally outwardly a distance greater than the radius 46 of wheel 44. In this regard, objects passing underneath the trailer will strike the contact portion and not wheels 44.

The axle support assembly 42 generally provides trailer 12 with a stiff suspension system. In this regard, although the axle support assemblies may include shock absorbers (not shown), the present simple and stiff suspension is advantageous for maintaining the trailer 12 level during transportation by ATV 14. The use of the foam cushion 133 further provides passenger comfort. Additionally, the overall number of components comprising each axle support assembly 42 is reduced which decreases manufacturing costs.

Turning now to FIG. 5, an alternate embodiment is shown retaining the same numbering as FIG. 1 but in a primed fashion. As shown, the contact portion 194' of skid component 190' has been extended. This extension enables trailer 12' to skid over or slidably engage with a wide variety of off-road obstacles 200, such as log, stumps, rocks, or the like encountered on ground 16'. Upon contacting these off-road obstacles 200, contact portions 194' will slidably engage obstacle 200. In turn, wheels 44' will be lifted off ground 16' and enable trailer 12' to pass over the obstacles. In the illustrated embodiment, skid component 190' forms an angle 192' with suspension support 175'. This angle 192' is approximately 60°.

Since certain changes may be made in the above apparatus without departing from the scope of the invention herein involved, all matter contained in the above description or shown in the accompanying drawing shall be interpreted as illustrative and not in a limiting sense.

What is claimed:

1. Apparatus for transporting a passenger and cargo over terrain comprising:

an all terrain vehicle having a pair of wheels spaced apart a width defining track, a support frame with a vertical ground clearance height, a rearwardly disposed towing tongue assembly and operable from an operating seat position located at a given elevation over said terrain to support an operator having an eye position line of sight; and a trailer attached to said vehicle comprising:
a main frame assembly extending between a forward and rearward portion;
a hitch arm forwardly extending from said main frame assembly forward portion to a position lower than said main frame assembly, said hitch arm being removably engaged with said all terrain vehicle towing tongue assembly;
a container housing supported upon said main frame assembly for carrying said cargo, said housing having three upstanding walls defining three sides of a cavity and a top portion;
said top portion including a seat for supporting said passenger at a vertically disposed seat position located at an elevation higher than said given elevation of said vehicle operating seat position an extent effective to normally provide said passenger with an unobstructed view at a line-of-sight elevation higher than said vehicle operator when seated at said operating seat position;
first and second axle support assemblies respectively including first and second spaced apart rigid suspension supports extending downwardly a predetermined distance from said main frame assembly to support respective first and second axles and said first and second axle support assemblies being spaced apart a distance to define an open gap therebetween; and
first and second wheels of given radius each mounted for free rotation upon respective said first and second axles,
said first and second axle support assemblies and said wheels vertically positioning said main frame assembly at a vertical ground clearance height greater than said ground clearance height of said all terrain vehicle support frame.

2. The apparatus of claim 1 in which each said first and second axle support assembly further comprises a skid component extending from one of said suspension supports to said main frame assembly, said skid component being upwardly angularly disposed with respect to said one suspension support and having a forward contact portion extending beyond the radius of a corresponding said wheel.

3. The apparatus of claim 1 in which said first and second wheels are spaced apart a distance corresponding with said width of said pair of all terrain vehicle wheels for following in said track.

4. The apparatus of claim 1 in which:

said seat extends over a first portion of said top portion for supporting said passenger; and including a lid assembly extending over a second portion of said top portion adjacent said seat providing an enclosure for said cavity.

5. Apparatus for transporting passengers and cargo over terrain comprising:

an all terrain vehicle having a vertical ground clearance height and operable by an operator from an operating seat position located at a given elevation over said terrain and having a pair of rearward wheels with a spacing defining a track and a rearwardly disposed towing tongue assembly and adapted to be drivable over a said terrain having off road obstacles; and a trailer attached to said vehicle comprising:
  a main frame assembly extending between a forward and rearward portion;
  a hitch arm extending from said forward portion to said rearward portion for providing a skid member for slideable contact over said off road obstacles and removably coupled with said all terrain vehicle towing tongue assembly;
  a container housing supported upon said main frame assembly having first and second oppositely disposed side walls each having a forward and rearward portion and a forward end wall defining three sides of a rearwardly extending cavity for carrying said cargo, and having a top portion including a lid assembly supported on and extending between each said side wall rearward portion for covering a first portion of said rearwardly extending cavity, and a seat extending from each said side wall forward portion over a second portion of said rearwardly extending cavity for supporting said passenger, said seat being at a vertically disposed seat position located at an elevation higher than said vehicle seat position given elevation an extent effective to normally provide said passenger with an unobstructed view at a line-of-sight elevation higher than said vehicle operator when seated at said operating seat position, and a seat extending from each said side wall forward portion over a second portion of said rearwardly extending cavity for supporting said passengers;
  first and second axle support assemblies spaced apart and extending downwardly a predetermined distance from said main frame assembly to support respective first and second axles;
  first and second wheels mounted for free rotation upon respective said first and second axles; and
  said first and second axle support assemblies spacing said first and second wheels apart a distance corresponding with said vehicle wheels spacing.

6. The apparatus of claim 5 in which:
each said first and second side wall has a forward end and a rearward end;
said container housing further comprises a tailgate extending between said side walls rearward end adjacent said main frame assembly rearward portion, moveable between a horizontal open position and a vertical closed position, and having two leveling attachments each connected to one of said side walls for securing said tailgate at said horizontal open position; and
said tailgate and said lid assembly each have a connector component alignable when said tailgate is in said vertical closed position for securing said tailgate and said lid assembly.

7. The apparatus of claim 5 in which said lid assembly has a top surface portion formed of a sound absorbing material, and at least one connector for securing said cargo to said sound absorbing top surface portion.

8. The apparatus of claim 5 which further comprises:
a front shield having a lower portion supported upon said main frame assembly forward portion, extending upwardly therefrom to an upper portion for providing a safety wall for said passengers during transportation of said trailer by said all terrain vehicle; and
a foot support assembly supported upon said main frame assembly between said container housing and said front shield for providing foot support for said passengers.

9. The apparatus of claim 8 in which:
said front shield is slightly forwardly bowed to add rigidity thereto; and
said upper portion further includes a support bar graspable by said passengers for providing support.

10. The apparatus of claim 8 in which said front shield upper portion includes a forwardly extending debris deflection lip.

11. Apparatus for transporting passenger and cargo over terrain having off road obstacles comprising:
a vehicle having a support frame with a vertical ground clearance height and a rearwardly disposed towing tongue assembly and operable from an operating seat position located at a given elevation over said terrain to support an operator with an eye position line of sight; and
a trailer attached to said vehicle comprising:
  a main frame assembly extending between a forward and rearward portion;
  a hitch arm extending from said forward portion removably coupled with said all terrain vehicle towing tongue assembly;
  a container housing supported upon said main frame assembly defining a rearwardly extending cavity for carrying said cargo, including:
    a bottom portion supported upon said main frame assembly for supporting said cargo,
    first and second oppositely disposed side walls extending upwardly from said bottom portion each having a forward and rearward portion,
    a forward end wall extending between said first and second side walls at said forward portion,
    a lid extending between said side walls, over said rearwardly extending cavity and
    a seat adjacent said lid positioned for supporting said passenger at a vertically disposed seat position located at an elevation higher than said given elevation of said vehicle operating seat position an extent effective to normally provide said passenger with an unobstructed view at an elevation higher than said vehicle operator line of sight;
  first and second independent axle support assemblies each spaced apart to define an open gap therebetween and extending downwardly a predetermined distance from said main frame assembly; and
  first and second wheels mounted for free rotation upon respective said first and second axle support assemblies.

12. The apparatus of claim 11 which said first and second axle support assemblies and said wheels vertically position said main frame assembly at a vertical ground clearance height greater than said ground clearance height of said vehicle support frame.

13. The apparatus of claim 11 in which said hitch arm extends from said main frame forward portion toward said rearward portion for providing a skid member positioned for slidable engagement with said off road obstacles.

14. The apparatus of claim 11 which further comprises:

a front shield having a lower portion supported upon said main frame assembly forward portion, extending upwardly therefrom to an upper portion for providing a safety wall for said passengers during transportation of said trailer by said all terrain vehicle; and a foot stand supported upon said main frame assembly between said side wall forward portion and said front shield lower portion for providing foot support for said passengers.

* * * * *